United States Patent
Mohajerani et al.

(10) Patent No.: US 12,206,760 B1
(45) Date of Patent: Jan. 21, 2025

(54) HARDWARE ARCHITECTURE CONFIGURED TO IMPLEMENT ASCON CRYPTOGRAPHIC ALGORITHMS AND PROTECT AGAINST SIDE-CHANNEL ATTACKS

(71) Applicant: PQSECURE TECHNOLOGIES, LLC, Boca Raton, FL (US)

(72) Inventors: Mohamad Kamyar Mohajerani, Fairfax, VA (US); Emre Karabulut, Raleigh, NC (US)

(73) Assignee: PQSecure Technologies, LLC, Boca Raton, FL (US)

( * ) Notice: Subject to any disclaimer, the term of this patent is extended or adjusted under 35 U.S.C. 154(b) by 0 days.

(21) Appl. No.: 18/725,997

(22) PCT Filed: Aug. 30, 2023

(86) PCT No.: PCT/US2023/031497
§ 371 (c)(1),
(2) Date: Jul. 1, 2024

(51) Int. Cl.
*H04L 9/06* (2006.01)
(52) U.S. Cl.
CPC .................. *H04L 9/0631* (2013.01)
(58) Field of Classification Search
None
See application file for complete search history.

(56) References Cited

U.S. PATENT DOCUMENTS

| | | | |
|---|---|---|---|
| 2007/0014395 A1* | 1/2007 | Joshi | H04L 9/004 380/28 |
| 2014/0380037 A1* | 12/2014 | Matsuda | H04L 63/06 713/150 |
| 2016/0056955 A1* | 2/2016 | Duplys | H04L 9/0631 380/29 |
| 2018/0097618 A1 | 4/2018 | Kumar et al. | |
| 2019/0286853 A1 | 9/2019 | Belenky et al. | |
| 2020/0244434 A1 | 7/2020 | Altera | |
| 2022/0066741 A1 | 3/2022 | Saarinen | |
| 2024/0106628 A1 | 3/2024 | Ghosh | |

FOREIGN PATENT DOCUMENTS

WO 2023115022 A2 6/2023

* cited by examiner

*Primary Examiner* — William J. Goodchild
(74) *Attorney, Agent, or Firm* — Johnson | Dalal; Mark. C. Johnson

(57) ABSTRACT

A hardware architecture configured to implement ASCON cryptographic algorithms and protect against side-channel attacks that includes a co-processor having a controller, a logic gate operably configured to receive a data input and ASCON state memory data in an initial cycle of permutation iterations, a multiplexor operably configured to direct data input from the logic gate based on a signal received from the controller and in the initial cycle of permutation iterations, an ASCON state memory operably configured to receive the processed data in the initial cycle of permutation iterations, and that is operably configured to implement a permutation round configured to receive the data input directly from the logic gate through the multiplexor and process the data input utilizing a permutation function to generate processed data and in the initial cycle of permutation iterations.

11 Claims, 13 Drawing Sheets

FIG. 11

HARDWARE ARCHITECTURE CONFIGURED TO IMPLEMENT ASCON CRYPTOGRAPHIC ALGORITHMS AND PROTECT AGAINST SIDE-CHANNEL ATTACKS

FIELD OF THE INVENTION

The present invention is generally directed toward hardware-based methods and systems implemented in cryptosystems and, more particularly, is directed toward enhancements to efficiency and side-channel resistance of cryptosystems.

BACKGROUND OF THE INVENTION

Lightweight cryptographic algorithms are used to provide confidentiality, integrity, authentication, and non-repudiation and protect data created and transmitted by embedded Internet-of-Things (IoT) devices. These devices often face strict power, energy, and latency constraints and therefore require efficient execution of the cryptographic algorithms.

These and other security-sensitive applications, including smart cards, Trusted Platform Modules (TPM), and cryptocurrency wallets, must protect their sensitive data against side-channel attacks (SCAs) including attacks based on timing, power, and electromagnetic emanation. More specifically, lightweight cryptography refers to a class of cryptographic primitives that have a small footprint and lower computational requirements and are specifically tailored for resource-constrained applications. Optimized hardware implementations can unleash the full potential of lightweight cryptographic algorithms, including lower energy consumption, higher performance, and higher resilience against side-channel attacks.

Side-channel attacks are adversarial methods for compromising the security of cryptographic implementations by analyzing the information leaked through physical side-effects such as power consumption or electromagnetic emanations. Masking is an effective countermeasure against side-channel attacks that works by splitting sensitive variables into multiple randomized shares. A masked implementation operates on these shares in a way that prevents attackers from correlating physical side-channel information with the original secret variables.

Several masking schemes have been proposed in the literature as well as mathematical models to evaluate their effectiveness. The 't-probing' model deems a circuit 't-probing secure' if taking at most 't' intermediate variables would not leak any information about its secret data. The maximum value of 't' holding this property is referred to as the security order of the circuit. A secure masking scheme of security order 'd' requires splitting the sensitive variables into at least 'd+1' shares.

Small subcircuits that operate on the masked data and implement elementary functions are referred to as "gadgets". Gadgets can be used as blocks for building more complex masked circuits. Several masking gadgets have been introduced in the literature including DOM-indep, DOM-dep, HPC, HPC2, HPC3, HPC3+, O-PINI1, and O-PINI2. However, combining individually secure gadgets does not necessarily result in a secure circuit. Composability refers to the capability of a gadget to maintain side-channel security when integrated into a larger circuit and interacting with other components. In order to analyze the composability of gadgets, several additional mathematical models have been proposed including Non-Interference (NI), Strong Non-Interference (SNI), and Multiple-Input Multiple-Output Strong Non-Interference (MIMO-SNI).

ASCON suite is a family of lightweight cryptographic algorithms providing authenticated encryption with associated data (AEAD), hashing, extensible output functions (XOF), and pseudo-random functions (PRF). ASCON has been selected by the US National Institute of Standards and Technology (NIST) for a new lightweight cryptography standard. Previously, it had been selected by the international CAESAR competition for use in lightweight applications. Example use cases include lightweight secure boot, digital fingerprinting of messages, inline memory encryption, low-footprint root-of-trust implementations, and vehicle-to-vehicle communication.

ASCON is based on a sponge construction and has an internal state memory of 320 bits, hereafter referred to as the "ASCON state", which can be organized into five 64-bit words. In a cryptographic operation, the ASCON state is initialized and subsequently transformed by consecutive applications of a permutation function. Each iteration of the permutation is referred to as a "round" and each round consists of three layers: addition of the round constant (RC), substitution (S-box), and linear diffusion (LD).

ASCON specification version 1.2 specifies two variants of AEAD, hashing, and XOF operations. The first variants (Ascon-128, Ascon-Hash, Ascon-Xof) operate on 64-bit blocks of input and require $Ph=6$ rounds of permutation for the intermediate steps, while the second variants (Ascon-128a, Ascon-HashA, Ascon-XofA) operate on 128-bit blocks of input and require $Ph=8$ rounds of permutation for the intermediate steps. The size of input blocks is referred to as the "rate". The initial and final steps in both variants require $Pa=12$ rounds of permutation.

ASCON operations, including authenticated encryption and decryption, hashing, and XOF, are composed of multiple steps including Initialization, Permutation, Absorb, and Squeeze. In the Initialization step, the lower 64 bits of the ASCON state are initialized with a specific Initialization Vector (IV), and the higher bits are initialized either with zeros or, in AEAD, with a concatenation of nonce, key, and zeros. The Permutation step comprises $Pa (=12)$ or $Pb (=6$ or $8)$ rounds of permutation. The Absorb (absorption) step is an operation of the sponge construct where a possibly padded r-bit block of input data (consisting of associated data, ciphertext, plaintext, or hash message) is XORed into the lower 'r' bits of the state, where 'r' is referred to as the rate of the operation. It should be noted that during the absorption of the ciphertext (in decryption), the lower bits of the ASCON state are effectively replaced by those from the ciphertext block. In the Squeeze step, 'r' bits of the ASCON state are extracted and used for generating a block of output. ASCON AEAD operations are based on the duplex construction where the Squeeze and Absorb steps are applied in an alternating (or concurrent) fashion. Additionally, Absorb and Squeeze steps are interleaved with a Permutation step.

Folding is a known method for reducing the area of a hardware implementation by splitting the datapath and performing certain operations sequentially. Due to the inherent performance overhead as well as the potential area overhead introduced by the serialization itself (e.g., the addition of multiplexers), efficient folding of cryptographic implementations can be a challenge.

Unrolling is a method for improving the performance of hardware implementations by performing multiple iterations of a function (e.g., cryptographic permutation) in a single clock cycle.

Therefore, a need exists to overcome the problems with the prior art as discussed above.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments further and explain various principles and advantages all in accordance with the present invention.

FIG. 11 depicts a proposed formulation of an ASCON S-box in accordance with one embodiment of the present invention;

SUMMARY OF THE INVENTION

Figure 1:
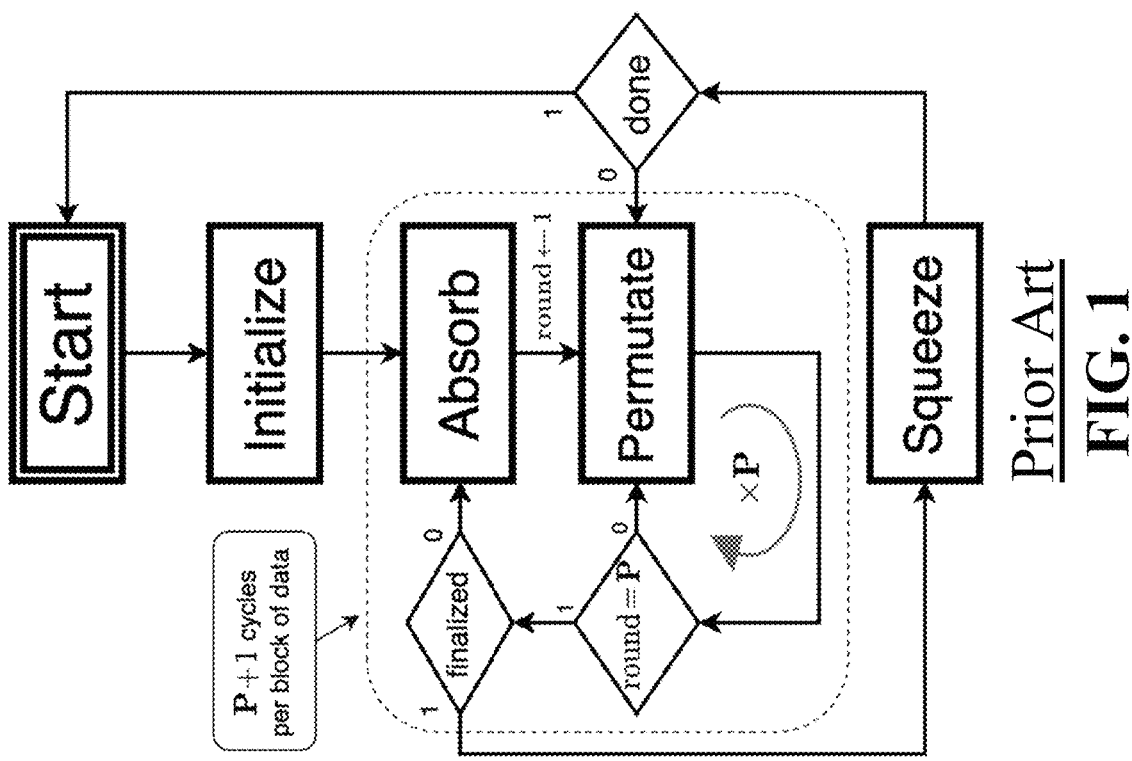
FIG. 1 depicts prior-art steps utilized in a baseline implementation of ASCON in the form of a finite state machine (FSM) diagram.

We present efficient and secure hardware designs implementing ASCON cryptographic operations, that are highly configurable and support any selection of ASCON variants and operations as well as robust masking as a countermeasure against side-channel attacks. Based on the specific requirements of the target application, higher performance or lower area configurations can be selected. The high-performance designs provide increased performance through optimized scheduling and datapath design, including but not limited to merging of absorption and permutation, efficient and secure low-latency masked S-box for optional side-channel protection, optimal use of PISO/SIPO, and optional unrolling. The low-area designs utilize the proposed shift-based folded and pipelined architecture, enabling higher-order side-channel protection in resource-constrained applications. All architectures utilize a proposed delay-agnostic interface for internal components, enabling agility, customization, and scalability with no additional engineering effort, while ensuring the correctness and security of the generated hardware.

With the foregoing and other objects in view, there is provided, in accordance with the invention, a hardware architecture configured to implement ASCON cryptographic algorithms and protect against side-channel attacks that may include a co-processor having a controller, having a logic gate operably configured to receive a data input and ASCON state memory data in an initial cycle of permutation iterations, having a multiplexor operably configured to direct data input from the logic gate based on a signal received from the controller and in the initial cycle of permutation iterations, that is operably configured to implement a permutation round configured to receive the data input directly from the logic gate through the multiplexor and process the data input utilizing a permutation function to generate processed data and in the initial cycle of permutation iterations, and that has an ASCON state memory operably configured to receive the processed data in the initial cycle of permutation iterations.

In accordance with a further feature of the present invention, the logic gate is an XOR logic gate.

In accordance with a further feature, an embodiment of the present invention also includes a serial-in and parallel-out data register operably configured to generate the data input received by the multiplexor and a parallel-in and serial-out data register operably configured to receive the ASCON state memory data in all remaining cycles of permutation iterations.

In accordance with an additional feature of the present invention, the serial-in and parallel-out data register is operably configured to perform a padding operation to generate the data input.

Also in accordance with the present invention, a hardware architecture configured to implement ASCON cryptographic algorithms is disclosed that includes a controller and an ASCON state memory formed from an array of data registers divided into a plurality of rows each including a plurality of chained data registers operably configured, in a first phase, to be initiated by the controller, to each either receive data content from a left-adjacent register or, if no left-adjacent register, receive data content from an output of an S-box module and operably configured in a second phase, sequentially following the first phase and initiated by the controller, to each receive data output from a linear diffusion operation utilizing data content from the plurality of chained data registers not including the data register in a first column of the array of data registers and the output of the S-box module.

In accordance with an additional feature of the present invention, the second phase occurs in a single clock cycle.

In accordance with an additional feature, an embodiment of the present invention also includes an array of data registers divided into five rows having the plurality of chained data registers.

Also in accordance with the present invention, a method of utilizing an interface in a hardware architecture configured to implement cryptographic algorithms is disclosed that includes the steps of receiving pieces of data into a hardware architecture configured to implement cryptographic algorithms and processing all pieces of data needing to be processed to generate pieces of processed data by implementing the steps of sending an input valid signal from a controller to an input interface of a processing module corresponding to the validity of one of the pieces of data input fed into the processing module and receiving an input ready signal by the controller and from the input interface of the processing module, wherein the input valid signal and the one piece of data are unchanged until receiving the input ready signal, and also receiving an output valid signal by the controller from an output interface of the processing module corresponding to the validity of one of the pieces of processed data and sending an output ready signal by the controller and to the output interface of the processing module, wherein the processing module is required to keep the output valid signal and the one piece of processed data unchanged until receiving the output ready signal from the controller.

In accordance with an additional feature of the present invention, the processing module includes at least one of a permutation module and a S-box module.

In accordance with an additional feature, an embodiment of the present invention also includes the processing module having at least one of a permutation module and a S-box module.

In accordance with a further feature, an embodiment of the present invention also includes receiving the at least one piece of data into the hardware architecture configured to implement ASCON cryptographic algorithms.

In accordance with yet another feature, an embodiment of the present invention also includes receiving the output valid signal by the controller from the output interface of the processing module corresponding to the validity of one of the pieces of processed data to be stored in an ASCON state memory.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms.

Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention.

While the specification concludes with claims defining the features of the invention that are regarded as novel, it is believed that the invention will be better understood from a consideration of the following description in conjunction with the drawing figures, in which like reference numerals are carried forward. The figures of the drawings are not necessarily drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of any processing chip. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

DETAILED EXPLANATION OF THE INVENTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a method and architecture which implements a symmetric key cryptographic algorithm ASCON efficiently, securely, and scalable by leveraging various techniques including merging operations and computational steps, low footprint implementations based on shift-based folding, pipelined datapath, and reordering main operations of the S-Box. The present invention also protects against side-channel attacks.

Figure 2:
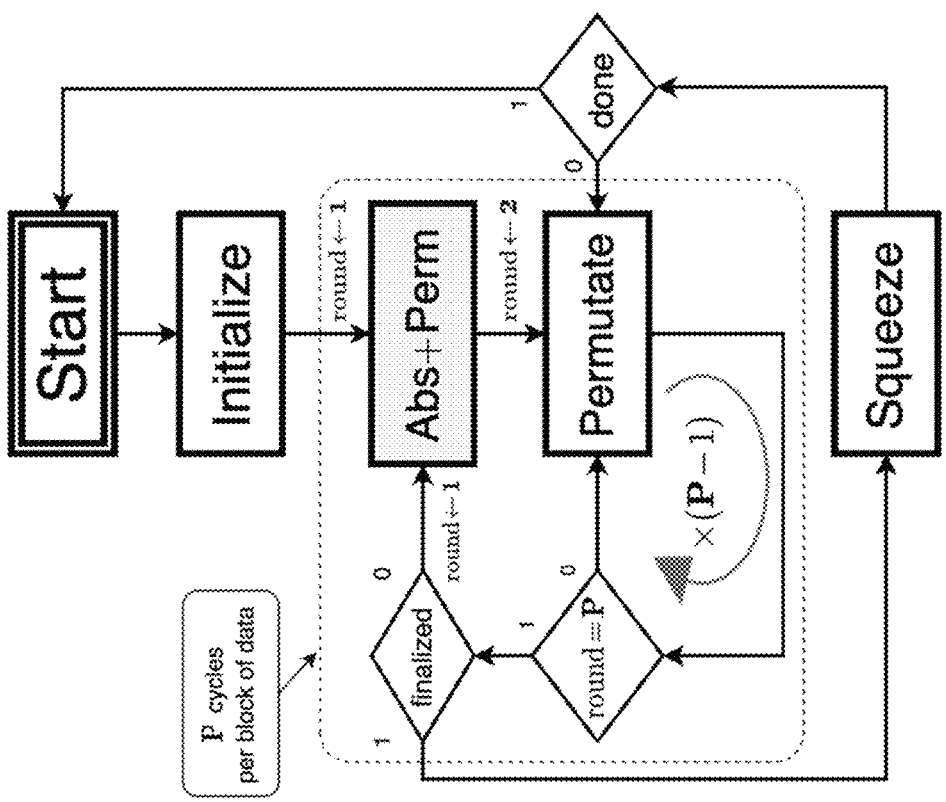
FIG. 2 depicts the transition of steps in a baseline implementation of ASCON associated with a hardware architecture configured to implement ASCON cryptographic algorithms in accordance with one embodiment of the present invention.
Figure 3:
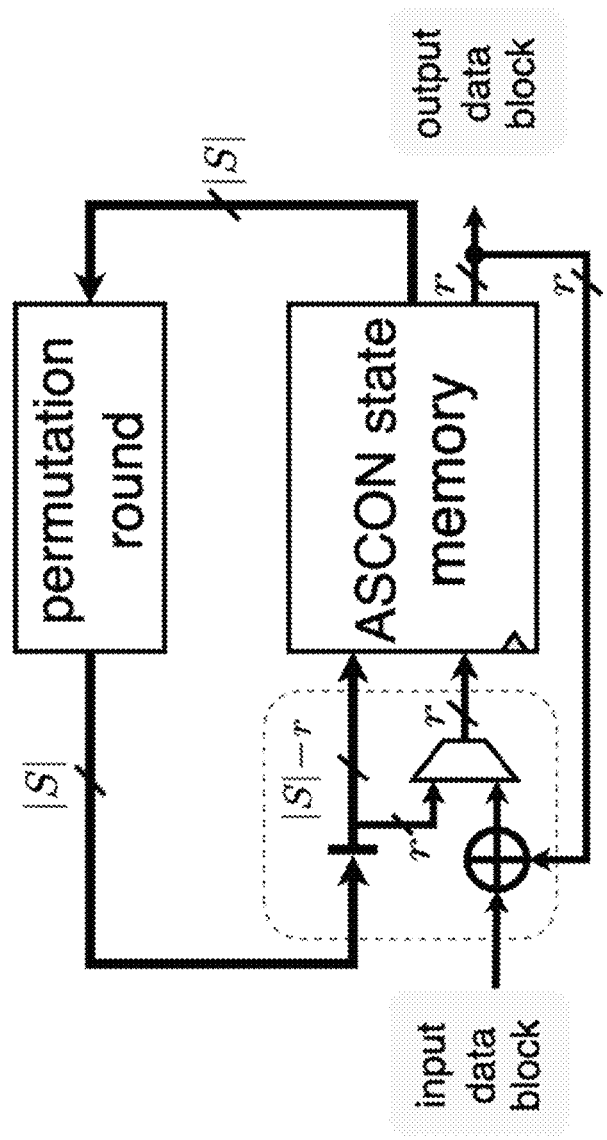
FIG. 3 is a block diagram depicting a prior-art hardware architecture associated with the steps in FIG. 1.
Figure 4:
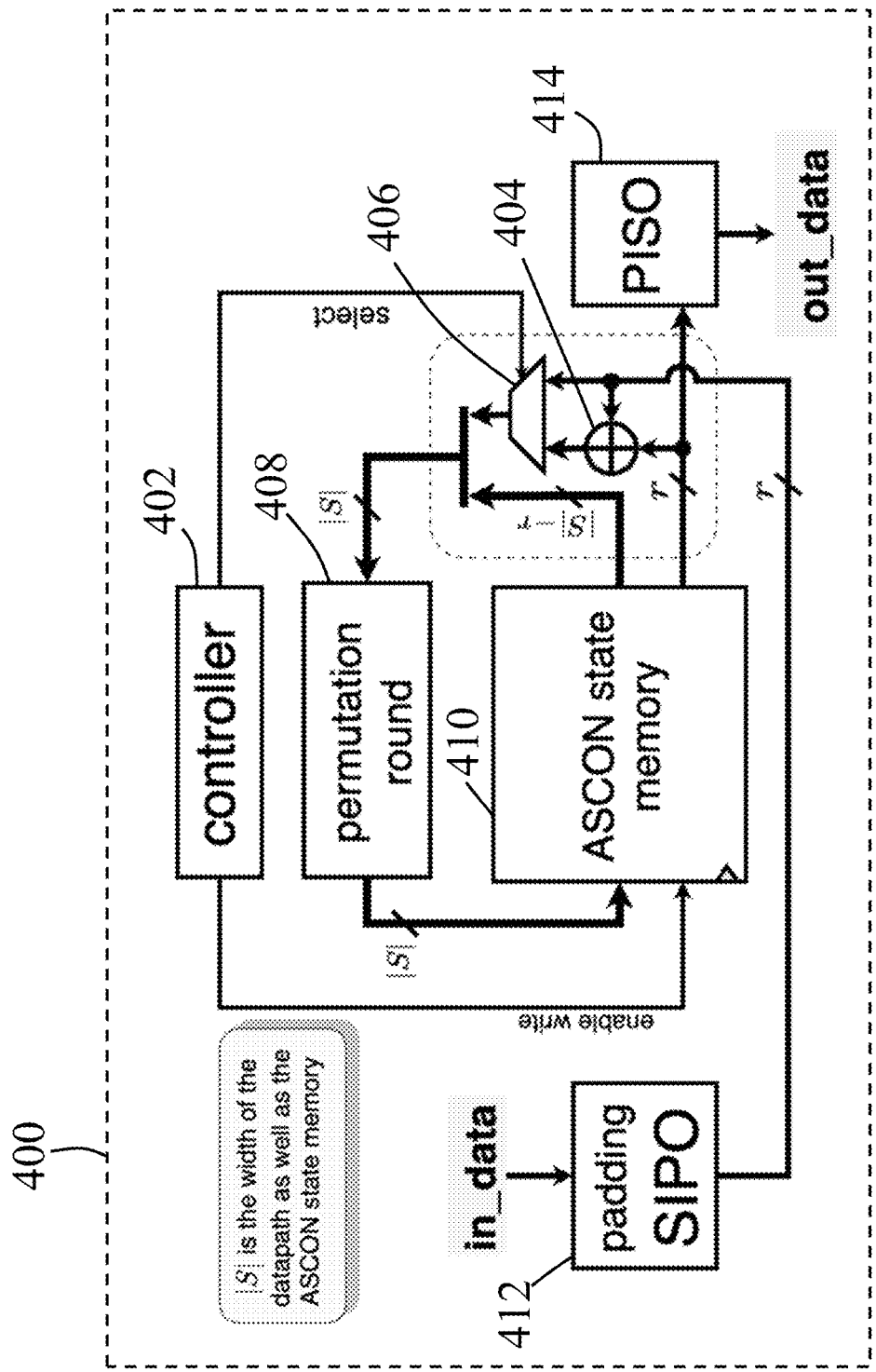
FIG. 4 is a block diagram depicting a hardware architecture configured to implement ASCON cryptographic algorithms in accordance with one embodiment of the present invention.

FIG. 1 and FIG. 3 illustrate prior-art block diagrams depicting steps in a baseline implementation of ASCON and hardware architecture associated therewith, respectively. FIG. 2 and FIG. 4 illustrate the transition of steps and a hardware architecture configured to implement ASCON cryptographic algorithms and protect against side-channel attacks, respectively, in accordance with the present invention. With reference to FIG. 2 and FIG. 4, the Absorb and Permutation operations can be seen to be merged to achieve higher performance. This optimization is based on the observation that in all ASCON operations (and across all variants) an Absorb step (or a combined Absorb and Squeeze) is followed by "P" rounds of permutation. The maximum throughput of operations is determined by the operating frequency as well as the number of clock cycles required to process each block of input data. Unrolling by a factor of "u" reduces the number of permutations to "P/u" and as a result, the number of cycles for processing a block is determined by "P/u+1" where u≥1 (u=1 for no unrolling) and the addition of 1 comes from the absorption cycle. Our proposed optimization eliminates the added absorption cycle and, combined with an input SIPO, an output PISO and optional unrolling, increases the throughput of operations. As such, the incurred overhead from this modification is minimal. FIG. 1 exemplifies the typical steps in a baseline implementation of ASCON in the form of a finite state machine (FSM) diagram. The rectangles represent FSM states, and the arrows indicate the transitions from one state to another. The operations begin from the "Start" state and progress in quantized time intervals synchronized through a clock signal and referred to as "clock cycles". At each clock cycle, an algorithmic step associated with the assumed FSM state is carried out. Based on evaluated conditions, the operation may proceed to a subsequent step (state) as illustrated by the arrows. In this figure as well as FIG. 2, the "Absorb" state covers both Absorb-only steps (e.g., for processing Associated Data and hashed message) and Absorb steps which may be performed concurrently with a Squeeze step (e.g., for processing plaintext and ciphertext). The "Squeeze" state covers the Squeeze operations that are not accompanied by any Absorb operations. The dashed areas highlight the states affected by the proposed optimization. Further, FIG. 2 shows the control flow of the proposed optimization in the form of FSM states and their transitions. The optimization is based on integrating the Absorb step into the first cycle of the Permute steps. The dashed areas highlight the FSM states affected by this optimization.

FIG. 3 exemplifies the datapath of a baseline implementation subjected to the proposed merging of the Absorb step into the permutation. The dashed frames highlight the modified components. '|S|' is the total size of ASCON state memory which for protection order 'd' (d≥0) is equal to (d+1)×320 bits. This or similar datapath designs dictate an execution flow in which the Absorb step requires a dedicated clock cycle for execution. FIG. 4 is a diagram depicting the proposed optimization that integrates the Absorb step into the first iteration of the Permute steps. By performing the Absorb together with a Permute in a single clock cycle, the proposed design eliminates the extra clock cycle overhead. This optimization requires an update on the datapath and the controller.

More specifically, the hardware architecture includes a co-processor 400 as it can be implemented with another processor. The hardware architecture also includes a controller 402 and XOR (exclusive OR) logic gate(s) 404, wherein the term logic gate may refer to multiple logic gates placed in parallel. The operation, and therefore the type of logic gate is dictated by ASCON algorithm, which is preferably always an XOR logic gate. As seen in the figures, the logic gate 404 is operably configured to receive a data input and ASCON state memory data in an initial cycle of permutation iterations. The hardware architecture also beneficially includes a multiplexor 406 operably configured to direct data input from the logic gate 404 based on a signal received from the controller 402 and in the initial cycle of permutation iterations. The co-processor 400 is also operably configured to implement a permutation round 408 configured to receive the data input directly from the logic gate 404 through the multiplexor 406 and process the data input utilizing a permutation function to generate processed data and in the initial cycle of permutation iterations. This is done without storing data in the Ascon state memory, which was performed in the prior art. The hardware architecture also includes an ASCON state memory 410 operably configured to receive the processed data in the initial cycle of permutation iterations after leaving the permutation round 408. To perform more effectively, the hardware architecture may also include a serial-in and parallel-out data register 412, or a SIPO or buffer, operably configured to generate the data input received by the multiplexor 406 and a parallel-in and serial-out data register 414, or a PISO or buffer, operably configured to receive the ASCON state memory data in all remaining cycles of permutation iterations. In preferred embodiments, the serial-in and parallel-out data register 412 is operably configured to perform a padding operation to generate the data input fed into the logic gate 404 and/or multiplexor 406.

Said differently, the present invention enables the performance of the Absorb and Permutation operations in the same clock cycle which results in higher performance and which is initiated by a signal from the co-processor 400. Said differently, the multiplexor 406 is operably configured to select, potentially based on a signal from the controller 402, the left input when in the initial cycle of permutation iterations and select the right input in all other permutation iterations.

The optimization of hardware architecture is based on the observation that in all ASCON operations, and across all ASCON variants, an Absorb step (or a combined Absorb and Squeeze) is followed by "P" rounds of permutation. In the depicted architecture, the absorption occurs in the same cycle as and right before the first cycle of permutation. The remaining permutations follow in the subsequent "P/u−1" cycles. This operation is applied for both protected and unprotected configurations.

Figure 5:
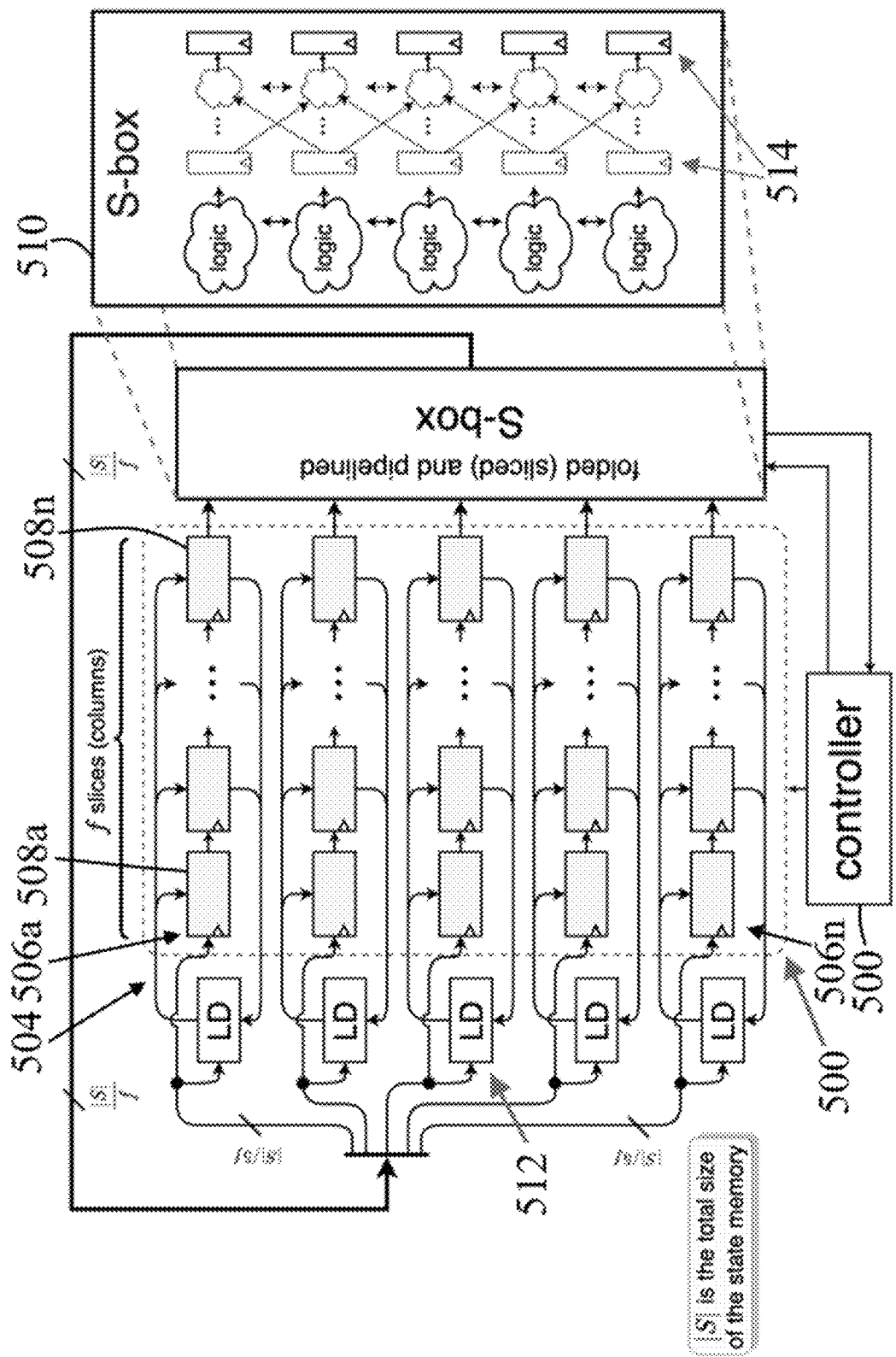
FIG. 5 is a block diagram depicting a hardware architecture configured to implement ASCON cryptographic algorithms in accordance with one embodiment of the present invention.

With reference to FIG. 5, which depicts a block diagram depicting a hardware architecture configured to implement ASCON cryptographic algorithms and to also potentially protect against side-channel attacks. Said another way, the block diagram in FIG. 5 shows the proposed folded architecture for ASCON where the five ASCON's state words are split into 'f' slices each and the S-box is applied on one slice at a time. The array of rectangles at the center shows the ASCON state memory organized into five rows where each row is divided into "f" registers. The registers on each row are connected sequentially, enabling the shifting of the data from left to right. The S-box receives data from the column of register slices on the far right of the array. S-box operates in a pipelined fashion and its output is shifted back into the registers on the left-most column of the array. As soon as the S-box outputs from the last slice are available, the linear diffusion (LD) layer is applied to each row of the state, either sequentially or in parallel and in a single clock cycle. While folding is a known method, its application to ASCON has not been previously reported. Additionally, the proposed shift-based architecture eliminates the overhead of multiplexers as used in prior folded designs. Furthermore, the proposed pipelined design of the S-box decreases the performance overhead incurred by folding.

The implementation in FIG. 5 is focused on reducing physical area (lightweight) footprint and is also more efficient than known prior-art implementation. Specifically, the hardware architecture includes a controller 500 and an ASCON state memory 502 that may be the same memory 410 depicted in FIG. 4. The ASCON state memory 502 is formed from an array 504 of data registers divided into a plurality of rows 506*a-n*, wherein "n" represents any number greater than one. As seen in the figures, each of the plurality of rows 506*a-n* includes a plurality of chained data registers, e.g., registers 508*a-n* operably configured, in a first phase, to be initiated by the controller 500, to each either receive data content from a left-adjacent register or, if there is no left-adjacent register, receive data content from an output of an S-box module 510. The S-box module 510 is described in more detail herein, but may be a mathematical or hardware component made up of logic gates/registers depicted with arrows 514) and may form a pipeline.

The plurality of chained data registers 502a-n are also beneficially operably configured, in a second phase sequentially following the first phase and initiated by the controller 500, to each receive data output from a linear diffusion operation (or LD, exemplified with arrow 512, utilizing data content from one or both of the plurality of chained data registers, e.g., registers 502a-n, not including the data register in a first column, e.g., register 502a, of the array 500 of data registers and the output of the S-box module 510. The second phase preferably also occurs in a single clock cycle. The array 500 of data registers is preferably divided into a 5f array of row-wise chained registers, i.e., five rows having the plurality of chained data registers 502a-n enabling the performance of ASCON operations.

The architecture in FIG. 5 may also be described as splitting the state registers into "f" slices, 64/f bits each, where "f" is configurable at hardware elaboration. Instead of operating on the full ASCON state, the S-box processes 1/f of the state in every cycle in a pipelined fashion. The datapath of this architecture is depicted in FIG. 3. As shown in FIG. 5, however, during the S-box operation, the state registers are shifted 64/f bits to the right, allowing the next slice to be processed in a subsequent clock cycle. The S-box is fully pipelined and its output is shifted back into the state registers. As soon as the S-box operation on the last slice of the state is completed, the linear diffusion (LD) function is applied on the intermediate state, consisting of the previously processed slices shifted into the state registers as well as the last processed slice residing at the final stage of the S-box pipeline. The absorption operation is also performed serially on slices in the same way as the S-box operations. Additionally, the previously described optimization for merging the absorb and permutation steps can also be applied to low-area configurations. For further saving of area, a secure tag verification operation is implemented in a serialized and pipelined architecture.

Figure 6:
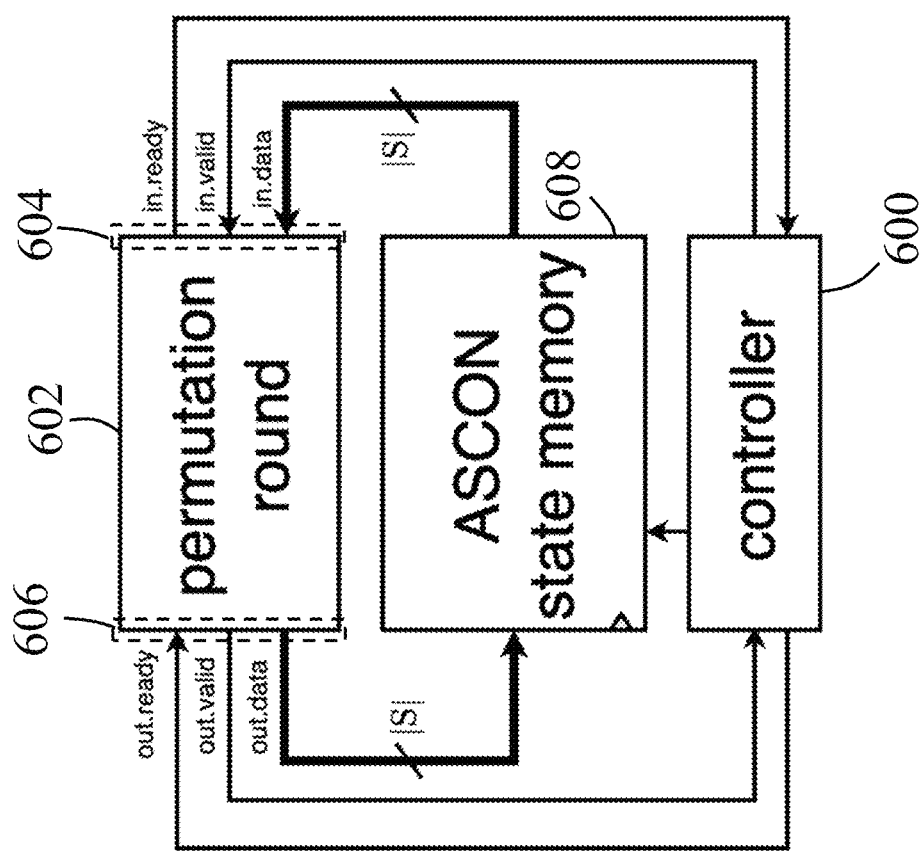
FIGS. 6-9 depict block diagrams depicting hardware architectures and interfaces configured to implement ASCON cryptographic algorithms in accordance with one embodiment of the present invention.
Figure 7:
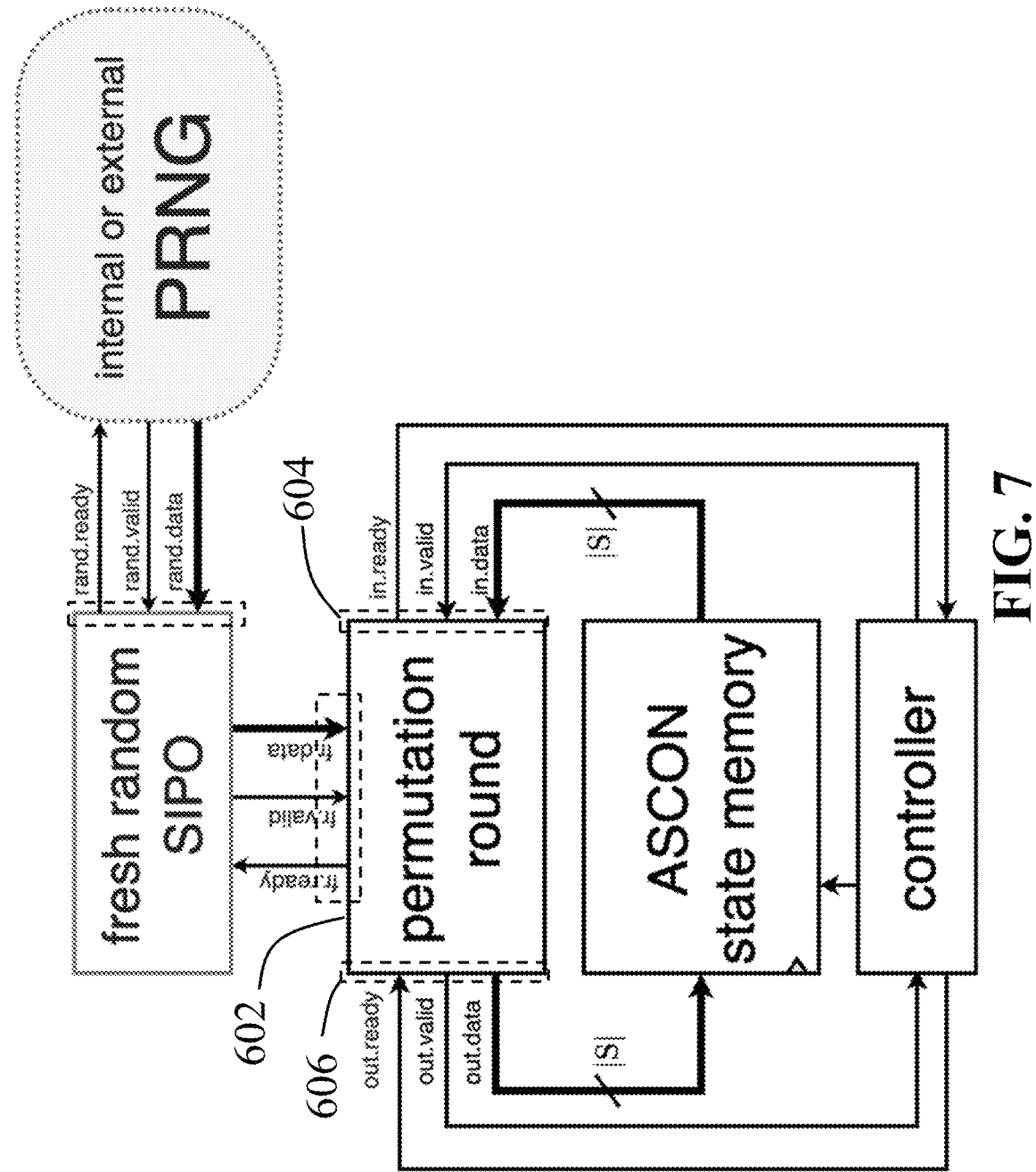
Figure 8:
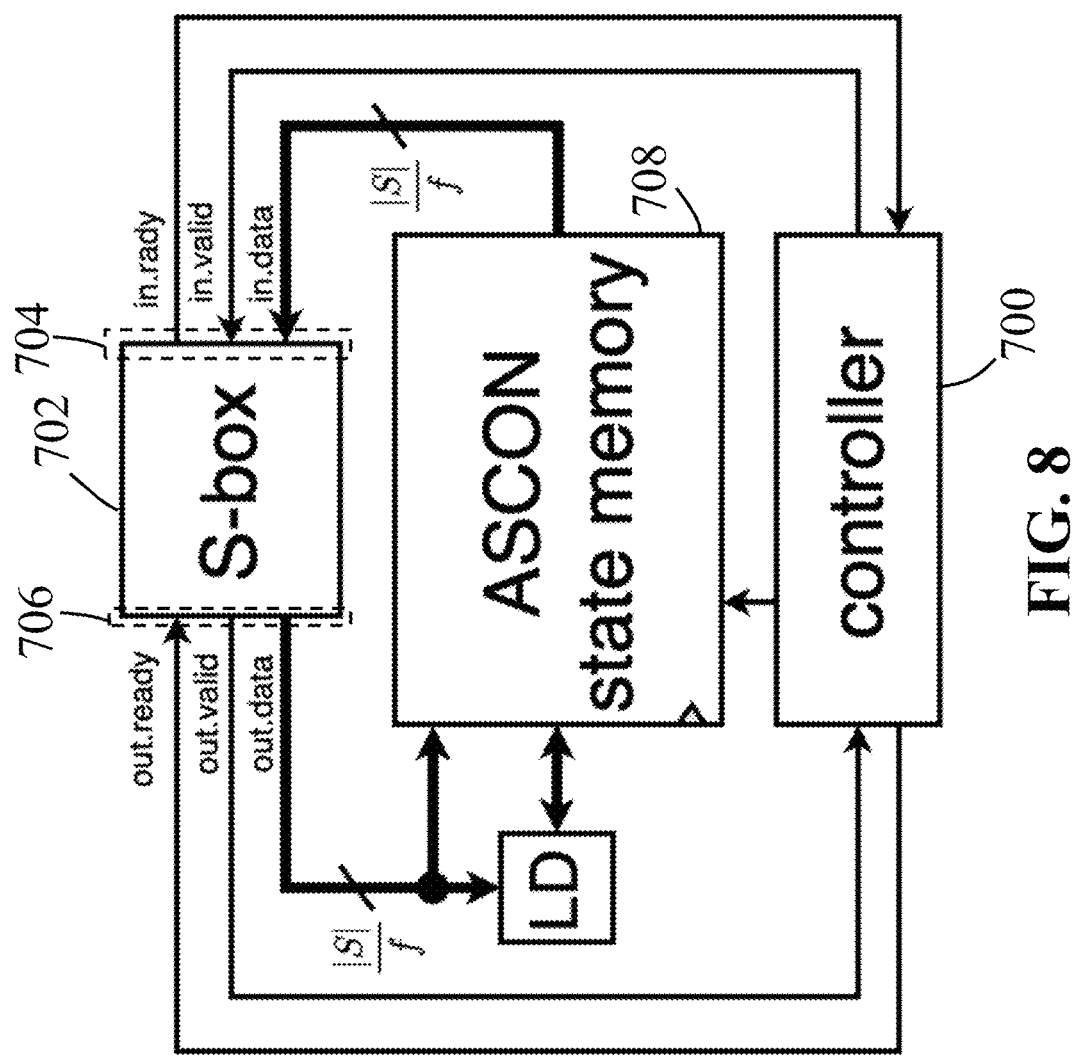

In the context of the invention and with reference to FIGS. 6-8, a method of utilizing an interface in a hardware architecture configured to implement cryptographic algorithms is also disclosed that includes the steps of receiving pieces of data into a hardware architecture configured to implement cryptographic algorithms and processing all pieces of data needing to be processed to generate pieces of processed data by implementing the steps of sending an input "valid" signal from a controller 600, 700 to an input interface 604, 704 of a processing module 602, 702 corresponding to the validity of one of the pieces of data input fed into the processing module 602, 702 and receiving an input "ready" signal by the controller 600, 700 and from the input interface 604, 704 of the processing module 602, 702. Importantly, the input valid signal and the one piece of data are unchanged until receiving the input ready signal. Further, the steps include receiving an output valid signal by the controller 600, 700 from an output interface 606, 706 of the processing module 602, 702 corresponding to the validity of one of the pieces of processed data and sending an output ready signal by the controller 600, 700 and to the output interface 606, 706 of the processing module 602, 702. Importantly, the output ready signal and the one of the pieces of processed data are unchanged until receiving the output ready signal. As seen in FIGS. 6-7, the processing module 602, 702 may include a permutation module or an S-box module, respectively, wherein FIG. 6 depicts a diagram for high-performance architecture and FIG. 7 depicts a diagram for a low-footprint architecture. Additionally, the process may include receiving at least one piece of data into a hardware architecture configured to implement ASCON cryptographic algorithms and also receiving the output valid signal by the controller 600, 700 from the output interface 606, 706 of the processing module 602, 702 corresponding to the validity of one of the pieces of processed data to be stored in an ASCON state memory 608, 708.

Said differently, a new architecture and design methodology for datapath and control is introduced. The proposed methodology includes the use of delay-agnostic interfaces for S-box and permutation hardware which allows permutation modules with varying delay requirements to be plugged into the design, without requiring additional engineering effort or changes to the remainder of the design. Specifically, different masking gadgets are available in the literature with different security guarantees, area overhead, and latency. The proposed methodology allows the masking gadgets and the order of SCA protection to be configured at hardware elaboration time, and based on these configurations, a permutation module is generated and plugged into the enclosing design. Additionally, this design provides optimized and Correctness-by-Construction (CbC) control flow for the required fresh randomness. Specifically, the generated control logic allows consuming randomness only when needed while ensuring side-channel security of the operations. This design methodology is applied in all configurations including high-performance and low-area implementations. The delay-agnostic interface and pluggable components are exemplified in FIG. 5. On the left, the use of the proposed delay-insensitive interface and pluggable "permutation round" module for a high-performance architecture is presented. The "permutation round" module incorporates the S-box and the linear diffusion (LD) layers and can be optionally unrolled. On the right, the same interface is used in a low-area configuration, where the S-box layer is "f" times folded, and the linear diffusion (LD) operates on the full word width.

Figure 10:
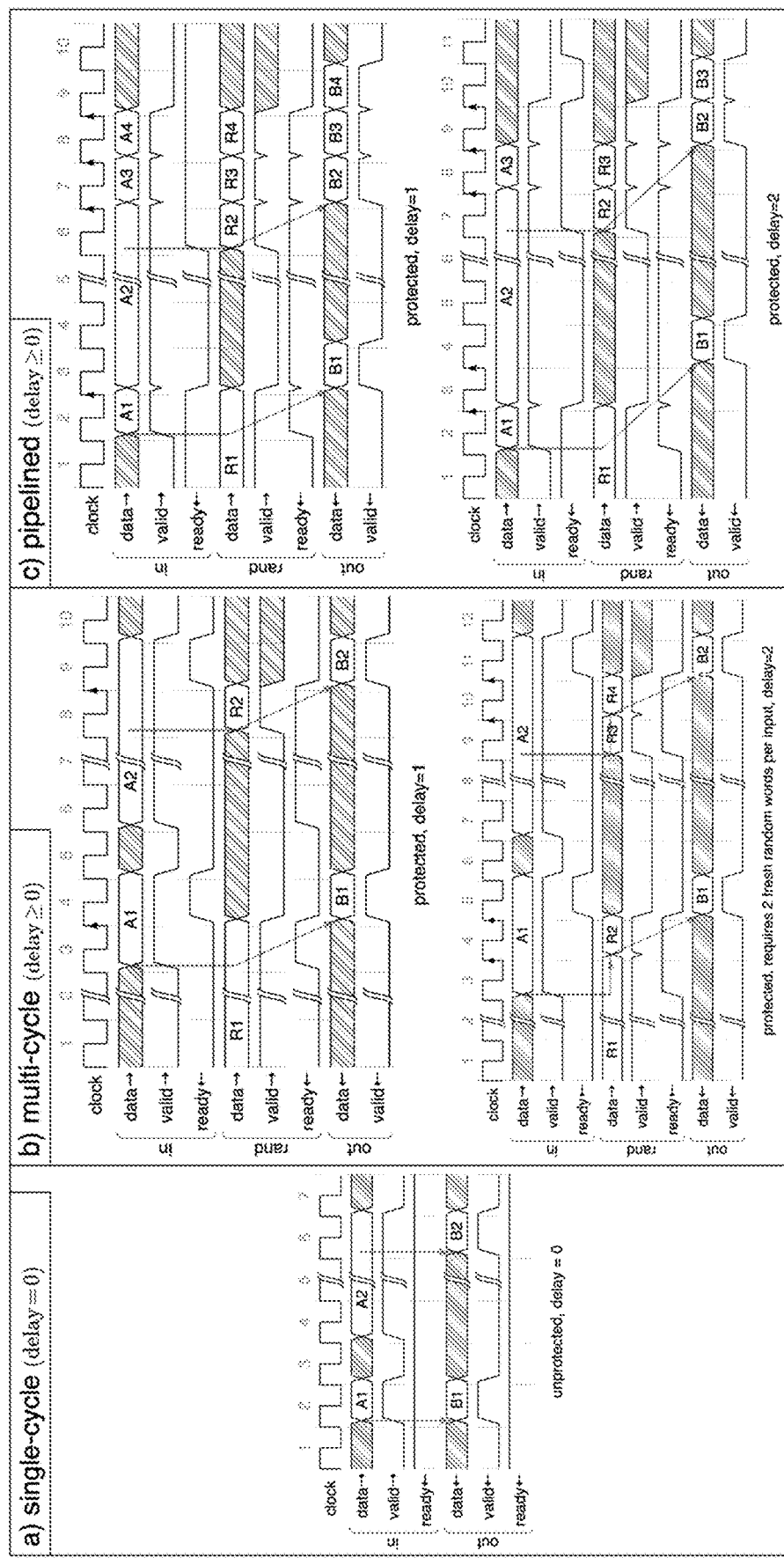
FIG. 10 shows examples of the proposed interface handshake and scheduling in multiple configurations in accordance with one embodiment of the present invention.

Examples of the handshake steps and corresponding control flow are provided in FIG. 10 as wave-from diagrams. For high-performance unprotected configurations, a combinational "permutation round" module with optional unrolling is likely to provide the best performance and/or efficiency. In protected configurations, due to inherent delays of the masking gadgets, multiple execution cycles may be required. In all configurations, the input and output interfaces operate according to an "irrevocable I/O" protocol: when a producer has its data available, it asserts the interface's valid signal and keeps both "data" and "valid" unchanged until a "ready" signal is received from the consumer. The same signaling is utilized irrespective of the internal details of the pluggable module, including combinational (single cycle, no delay), multi-cycle (the module requires one or more additional cycles for processing the data), and pipelined implementations.

The present invention also beneficially enables constructing of masked implementations of the ASCON S-box with stronger security guarantees, namely composability under the MIMO-SNI-robust model (Multiple-Input Multiple-Output Strong Non-Interfere model with the presence of glitches). This is achieved through a specific ordering of operations. The final output of the resulting formulation is equivalent to the original S-box specification, but the specific ordering of the operations ensures that a design incorporating the S-box does not leak information.

Additionally, the proposed S-box design archives this security guarantee with a total of 1 cycle of delay, without requiring extra fresh randomness, extra delay, multiple clock edges, or special hardware. SNI security of the S-box has been validated for 1st and 2nd order protection using the available formal verification tools (SILVER). Designs incorporating the proposed S-box have been experimentally verified for side-channel leakage using the standard Test-Vector Leakage Assessment (TVLA) as well as leakage assessment tools such as PROLEAD.

Said differently, FIG. 6 exemplifies an application of the proposed delay-agnostic design method for a high-performance architecture. The module labeled "permutation round" is the pluggable module that implements one or more rounds of ASCON permutation. The input interface consists of the "in.data" and "in.valid" input signals coming into the "permutation round" module and the "in.ready" signal going out to the controller. Similarly, the output interface consists of "out.data" and "out.valid" signals going out of the "permutation round" module and the "out.ready" signal coming into the module and driven by the controller. In a masked design, the "permutation round" module may need multiple clock cycles for processing each input and may also have an additional input interface for receiving fresh randomness.

Figure 9:
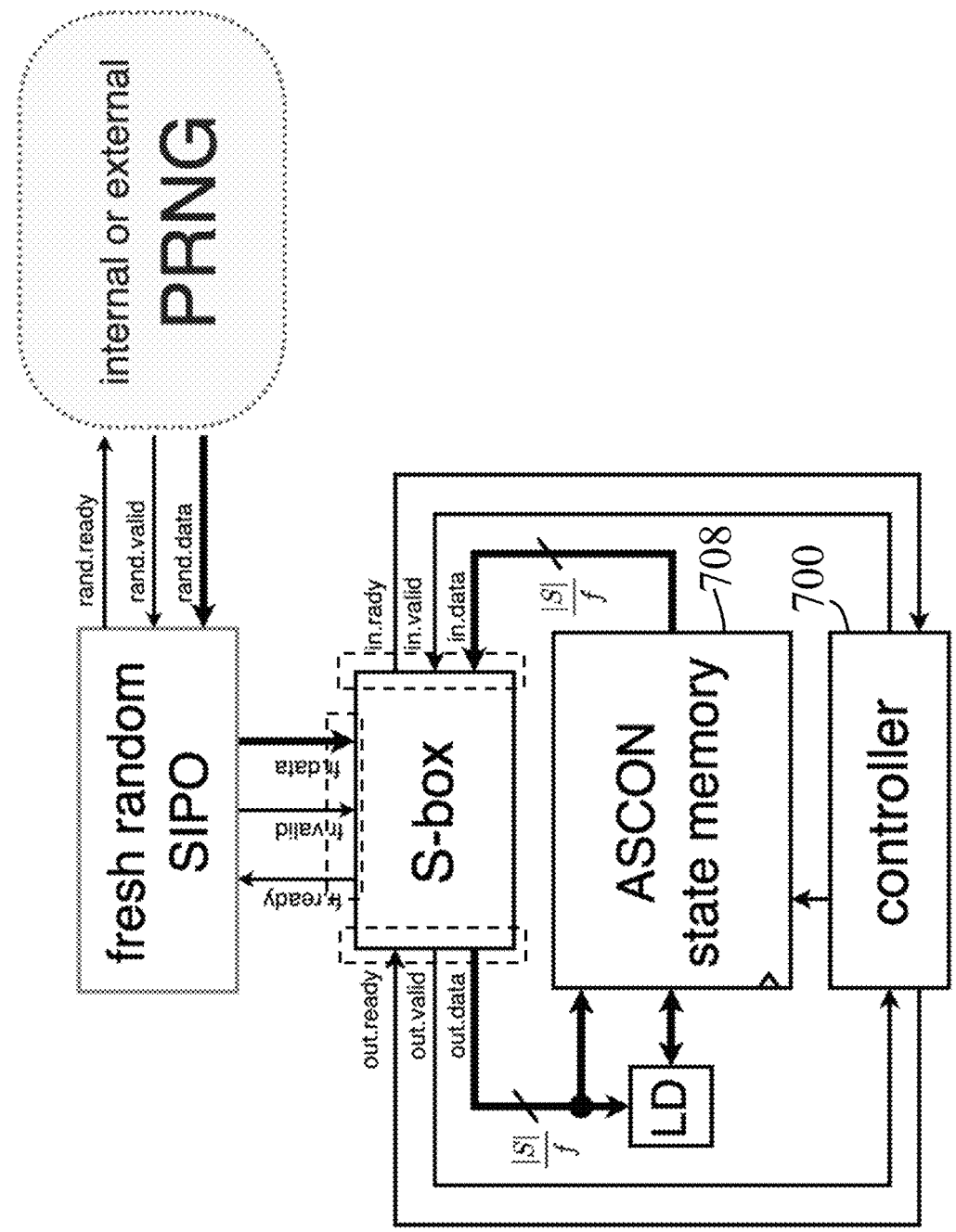

FIG. 8 exemplifies the application of the proposed delay-agnostic design method to a low-footprint (folded) architecture. The depicted design utilizes the delay-agnostic interface for communicating to its pipelined S-box module. The input interface has data and valid input signals going to the S-box module and a ready signal going out to the controller of the enclosing design. Similarly, the output interface consists of data and valid signals coming out of the S-box module as well as a ready signal driven by the enclosing design's controller and going into the S-box module. With reference to FIG. 9, a block diagram illustrating an exemplary hardware architecture and interface, similar to FIG. 7 is depicted, and is configured to implement ASCON cryptographic algorithms. The block diagram in FIG. 9, however, depicts an S-box module in said hardware architecture and interface.

Figure 11:
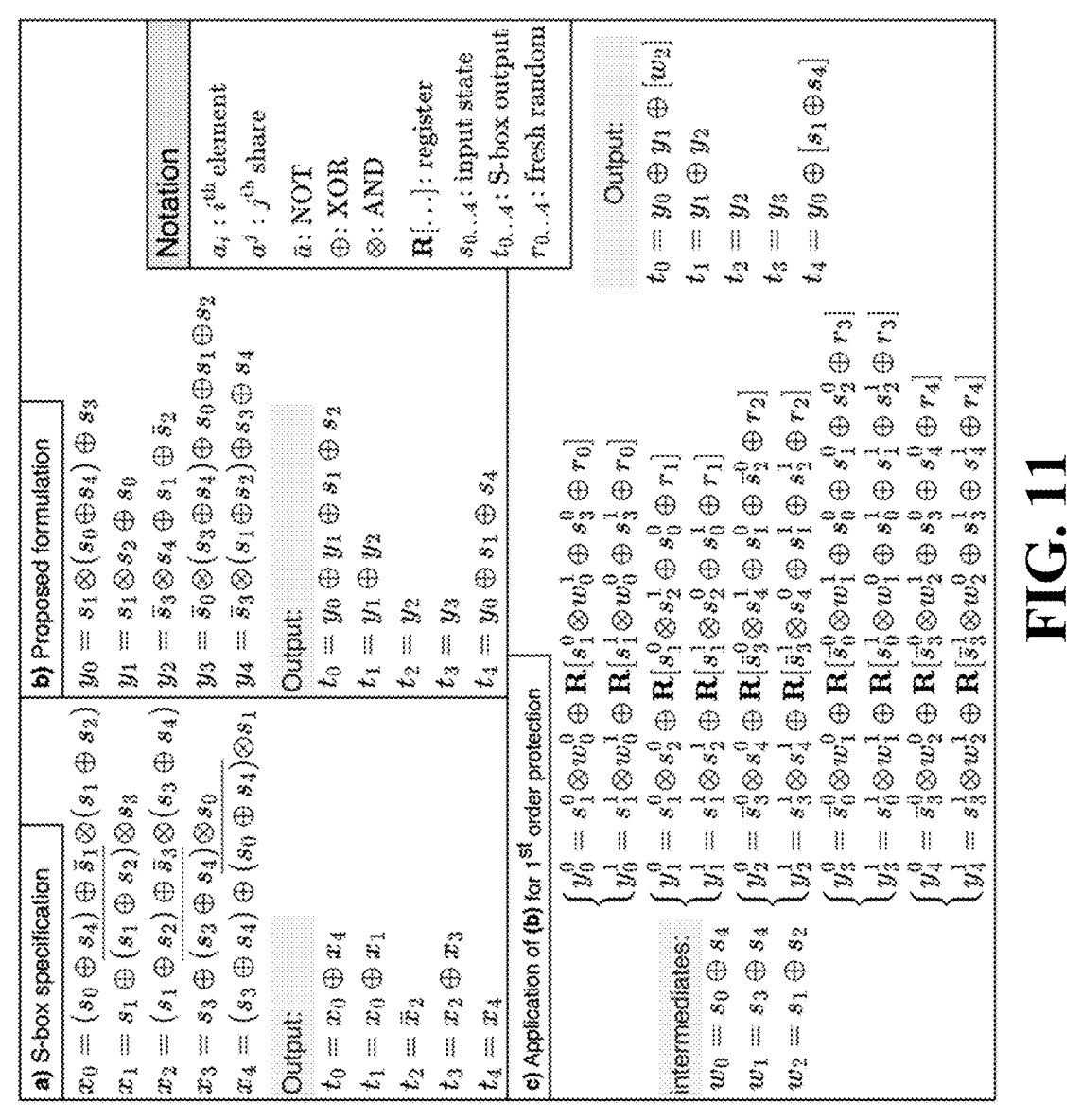
Figure 12:
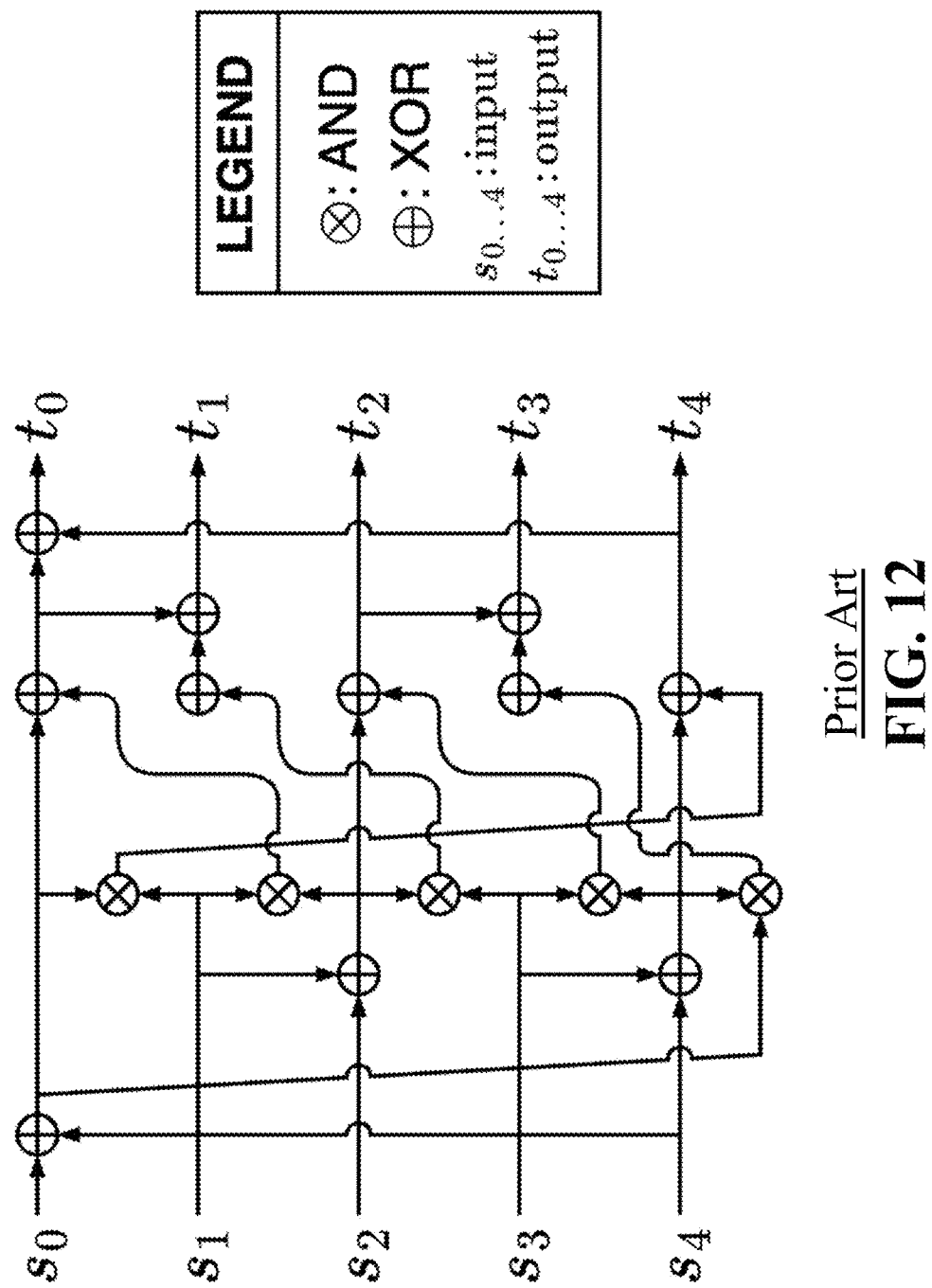
FIG. 12 is a schematic diagram of a prior-art ASCON S-box formulation as described in the ASCON specifications.
Figure 13:
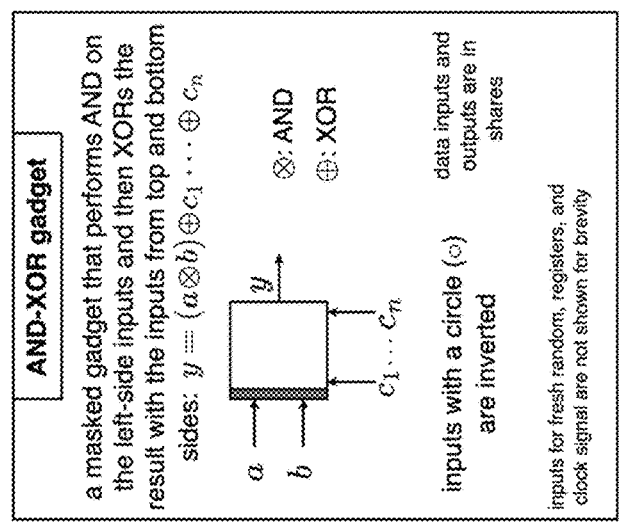
FIG. 13 is a schematic diagram based on a proposed reformulation of the ASCON S-box, wherein the rectangles with a black stripe on their left sides are gadgets implementing combined AND-XOR operations and, in masked form, the inputs, outputs, and intermediate signals comprise multiple shares.
Figure 13:
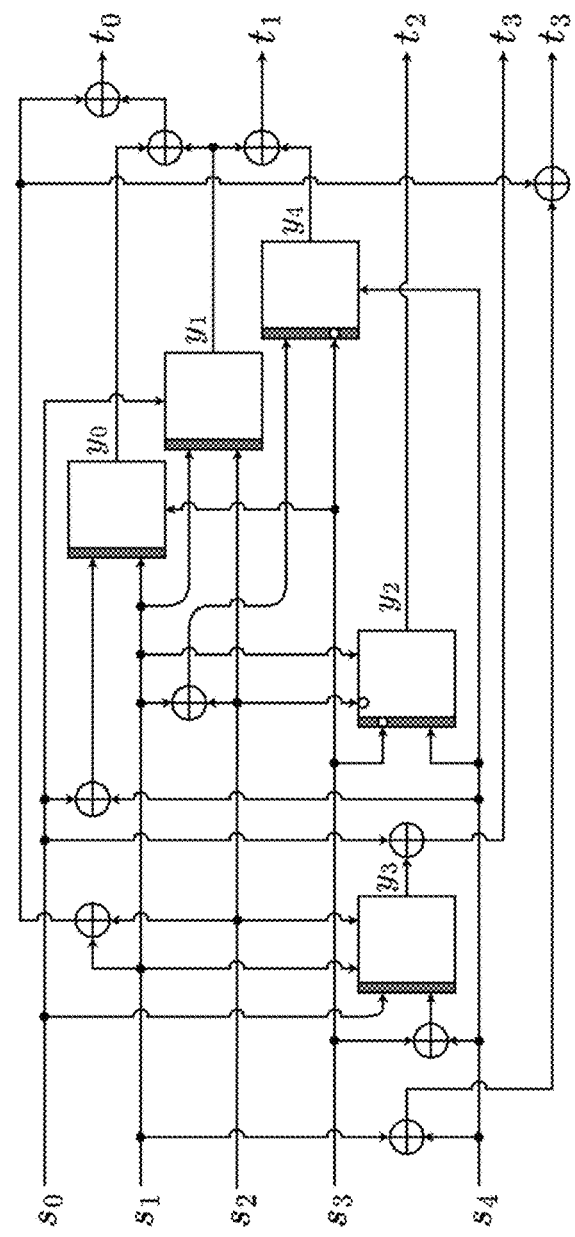

FIG. 11 depicts a proposed formulation of an ASCON S-box in accordance with one embodiment of the present invention which enables enhanced side-channel resistance. On the top left, diagram '(a)', is a straightforward formulation of the ASCON S-box, based on the ASCON specification and reference implementations (also presented in schematic form in FIG. 12). Next, on the top center, diagram '(b)' shows the general form of our proposed formulation in the form of purely mathematical formulas and not specific to a particular implementation. On the bottom, diagram '(c)' exemplifies the application of the proposed formulation in '(b)' to 1st-order protected implementations. This formulation shows the details of the operations on each share of the masked variables, the placement of registers, and the addition of fresh random input. FIG. 12. shows a schematic diagram of the proposed S-box formulation utilizing AND-XOR gadgets. This reformulation enables secure and efficient masked hardware implementations of the S-box with minimum delay and fresh-random requirements and SNI composability guarantees. FIG. 13 depicts a schematic diagram based on a proposed reformulation of the ASCON S-box enabling construction of a masked implementation of the S-box, wherein the rectangles with a black stripe on their left sides are gadgets implementing combined AND-XOR operations and, in masked form, the inputs, outputs, and intermediate signals comprise multiple shares.

Although a specific order of executing the process steps has been discussed above and claimed, the order of executing the steps may be changed relative to the order shown in certain embodiments. Also, two or more steps or blocks shown or described as occurring in succession may be executed concurrently or with partial concurrence in some embodiments. Certain steps may also be omitted for the sake of brevity. In some embodiments, some or all of the process steps can be combined into a single process.

Various modifications and additions can be made to the exemplary embodiments discussed above without departing from the scope of the present disclosure. For example, while the embodiments described above refer to particular features, the scope of this disclosure also includes embodiments having different combinations of features and embodiments that do not include all of the above-described features.

What is claimed is:

1. A hardware architecture configured to implement ASCON cryptographic algorithms and protect against side-channel attacks comprising:
   a co-processor:
      having a controller;
   having a logic gate operably configured to receive a data input and ASCON state memory data in an initial cycle of permutation iterations;
   having a multiplexor operably configured to direct data input from the logic gate based on a signal received from the controller and in the initial cycle of permutation iterations; operably configured to implement a permutation round configured to receive the data input directly from the logic gate through the multiplexor without storing data in the Ascon state memory and process the data input utilizing a permutation function to generate processed data and in the initial cycle of permutation iterations; and
   an ASCON state memory operably configured to receive the processed data in the initial cycle of permutation iterations.

2. The hardware architecture according to claim 1, wherein, the logic gate is an XOR logic gate.

3. The hardware architecture according to claim 1, further comprising:
   a serial-in and parallel-out data register operably configured to generate the data input received by the multiplexor; and
   a parallel-in and serial-out data register operably configured to receive the ASCON state memory data in all remaining cycles of permutation iterations.

4. The hardware architecture according to claim 3, wherein the serial-in and parallel-out data register is operably configured to perform a padding operation to generate the data input.

5. A hardware architecture configured to implement ASCON cryptographic algorithms comprising:
   a controller; and
   an ASCON state memory formed from an array of data registers divided into a plurality of rows each including: a plurality of chained data registers operably configured, in a first phase, to be initiated by the controller, to each either receive data content from a left-adjacent register or, if no left-adjacent register, receive data content from an output of an S-box module and operably configured in a second phase, sequentially following the first phase and initiated by the controller, to each receive data output from a linear diffusion operation utilizing data content from:
   the plurality of chained data registers not including the data register in a first column of the array of data registers; and the output of the S-box module.

6. The hardware architecture according to claim 5, wherein the second phase occurs in a single clock cycle.

7. The hardware architecture according to claim 5, further comprising:
an array of data registers divided into five rows having the plurality of chained data registers.

8. A method of utilizing an interface in a hardware architecture configured to implement cryptographic algorithms comprising the steps of:
receiving pieces of data into a hardware architecture configured to implement cryptographic algorithms and processing all pieces of data needing to be processed to generate pieces of processed data by implementing the steps of sending an input valid signal from a controller to a delay-agnostic input interface of a processing module pluggable into the hardware architecture and corresponding to the validity of one of the pieces of data input fed into the processing module and receiving an input ready signal by the controller and from the delay-agnostic input interface of the processing module, wherein the input valid signal and the one piece of data are unchanged until receiving the input ready signal; and
receiving an output valid signal by the controller from a delay-agnostic output interface of the processing module corresponding to the validity of one of the pieces of processed data and sending an output ready signal by the controller and to the delay-agnostic output interface of the processing module, wherein the processing module is required to keep the output valid signal and the one piece of processed data unchanged until receiving the output ready signal from the controller.

9. The method according to claim 8, wherein the processing module includes at least one of a permutation module and a S-box module.

10. The method according to claim 8, further comprising:
receiving the at least one piece of data into the hardware architecture configured to implement ASCON cryptographic algorithms.

11. The method according to claim 10, further comprising:
receiving the output valid signal by the controller from the delay-agnostic output interface of the processing module corresponding to the validity of one of the pieces of processed data to be stored in an ASCON state memory.

* * * * *